US010326995B2

(12) United States Patent
Gu et al.

(10) Patent No.: US 10,326,995 B2
(45) Date of Patent: Jun. 18, 2019

(54) SYSTEM AND METHOD FOR ESTIMATING VIEW SYNTHESIS DISTORTION

(71) Applicants: Futurewei Technologies, Inc., Plano, TX (US); Santa Clara University, Santa Clara, CA (US)

(72) Inventors: Zhouye Gu, Santa Clara, CA (US); Nam Ling, San Jose, CA (US); Chen-Xiong Zhang, Plano, TX (US); Jianhua Zheng, Beijing (CN)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 121 days.

(21) Appl. No.: 15/640,290

(22) Filed: Jun. 30, 2017

(65) Prior Publication Data

US 2017/0310970 A1   Oct. 26, 2017

Related U.S. Application Data

(63) Continuation of application No. 14/588,646, filed on Jan. 2, 2015, now Pat. No. 9,699,462.

(Continued)

(51) Int. Cl.
*H04B 1/66* (2006.01)
*H04N 19/136* (2014.01)
*H04N 19/503* (2014.01)
*H04N 19/154* (2014.01)

(52) U.S. Cl.
CPC ......... *H04N 19/136* (2014.11); *H04N 19/154* (2014.11); *H04N 19/503* (2014.11)

(58) Field of Classification Search
CPC .. H04N 19/597; H04N 19/172; H04N 19/115; H04N 19/154; H04N 2213/003;
(Continued)

(56) References Cited

U.S. PATENT DOCUMENTS

2013/0321574 A1* 12/2013 Zhang .................. H04N 19/597
348/43
2013/0342644 A1* 12/2013 Rusanovskyy ...... H04N 19/597
348/43

OTHER PUBLICATIONS

Zhang et al., "3D-HEVC Test Model 5," Joint Collaborative Team on 3D Video Coding Extension Development of ITU-T SG 16 WP 3 and ISO/IEC JTC 1/SC 29/WG 11, JCT3V-E1005, 5th Meeting: Vienna, AT, Jul. 27-Aug. 2, 2013, 57 pages.

(Continued)

*Primary Examiner* — Sathyanaraya V Perungavoor
*Assistant Examiner* — Peet Dhillon
(74) *Attorney, Agent, or Firm* — Slater Matsil, LLP

(57) ABSTRACT

System and method embodiments are provided for achieving improved View Synthesis Distortion (VSD) calculation and more accurate distortion estimation of encoded video frames. An embodiment method includes obtaining a depth map value for a video frame and determining a weighting factor for depth distortion in accordance with the depth map value. The weighting factor maps a pixel range of the depth map value to an output function having higher values for closer image objects and lower values for farther image objects. The VSD for the video frame is then calculated as a function of absolute horizontal texture gradients weighted by a depth distortion value and the weighting factor determined in accordance with the depth map value.

20 Claims, 2 Drawing Sheets

Related U.S. Application Data

(60) Provisional application No. 61/923,500, filed on Jan. 3, 2014.

(58) Field of Classification Search
CPC ... H04N 19/147; H04N 19/124; H04N 13/161
USPC ........................................................ 375/240
See application file for complete search history.

(56) References Cited

OTHER PUBLICATIONS

Rusanovskyy et al., "Common Test Conditions of 3DV Core Experiments," Joint Collaborative Team on 3D Video Coding Extension Development of ITU-T SG 16 WP 3 and ISO/IEC JTC 1/SC 29/WG11, JCT3V-F1100, 6th Meeting: Geneva, CH, Oct. 25-Nov. 1, 2013, 7 pages.

Gu et al., "VSD Bugfix and Improvement," Joint Collaborative Team on 3D Video Coding Extension Development of ITU-T SG 16 WP 3 and ISO/IEC JTC 1/SC 29/WG 11, JCT3V-G0163, 7th Meeting: San Jose, USA, Jan. 9-Jan. 17, 2014, 3 pages.

Sullivan et al., "Meeting Report of the Seventh Meeting of the Joint Collaborative Team on 3D Video Coding Extension Development (JCT-3V), San Jose, US, Jan. 11-17, 2014," Joint Collaborative Team on 3D Video Coding Extension Development of ITU-T SG 16 WP 3 and ISO/IEC JTC 1/SC 29/WG 11, JCT3V-G1000, 7th Meeting: San Jose, US, Jan. 11-17, 2014. 107 pages.

\* cited by examiner

SYSTEM AND METHOD FOR ESTIMATING VIEW SYNTHESIS DISTORTION

This application is a continuation of U.S. application Ser. No. 14/588,646 filed on Jan. 2, 2015, entitled "System and Method for Estimating View Synthesis Distortion" which claims the benefit of U.S. Provisional Application No. 61/923,500 filed on Jan. 3, 2014 entitled "System and Method for Estimating View Synthesis Distortion," which are hereby incorporated herein by references as if reproduced in its entirety.

TECHNICAL FIELD

The present invention relates to video coding, and, in particular embodiments, to a system and method for estimating view synthesis distortion.

BACKGROUND

Video coding schemes include compression methods for reducing the size of encoded video in communications. The compression allows encoded video data to be transferred with improved bit-rate or bandwidth usage. The encoded video is then decompressed and decoded at the destination to retrieve the video's original data. However, the compression of video can introduce distortion in the view, which can degrade video viewing quality. Therefore, metrics for evaluating view distortion are used to determine whether the resulting distortion is acceptable. In the case of three-dimensional (3D) video coding, the metric for evaluating view distortion needs to take into account the depth dimension of the images that is the distance of the objects in the images from the camera. An efficient metric for properly evaluating view distortion, including depth impact, on 3D video images is needed.

SUMMARY OF THE INVENTION

In accordance with an embodiment, a method by a processor for estimating view synthesis distortion (VSD) for video coding includes obtaining a depth map value for a video frame and determining a weighting factor for depth distortion in accordance with the depth map value. The VSD for the video frame is then calculated as a function of absolute horizontal texture gradients weighted by a depth distortion value and the weighting factor determined in accordance with the depth map value.

In accordance with another embodiment, a method by a processor for estimating VSD for video coding includes obtaining a depth map value for a video frame and determining a weighting factor that maps a pixel range of the depth map value to an output function having higher values for closer image objects and lower values for farther image objects. The method further includes calculating the VSD as a product of a term for horizontal texture distortion and a term for depth distortion weighted by the weighting factor.

In accordance with yet another embodiment, an apparatus for estimating VSD comprises at least one processor and a non-transitory computer readable storage medium storing programming for execution by the at least one processor. The programming includes instructions to obtain a depth map value for a video frame and determine a weighting factor for depth distortion in accordance with the depth map value. The programming includes further instructions to calculate, for the video frame, the VSD as a function of a sum of absolute horizontal texture gradients weighted by a depth distortion value and the weighting factor for depth distortion determined in accordance with the depth map value.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
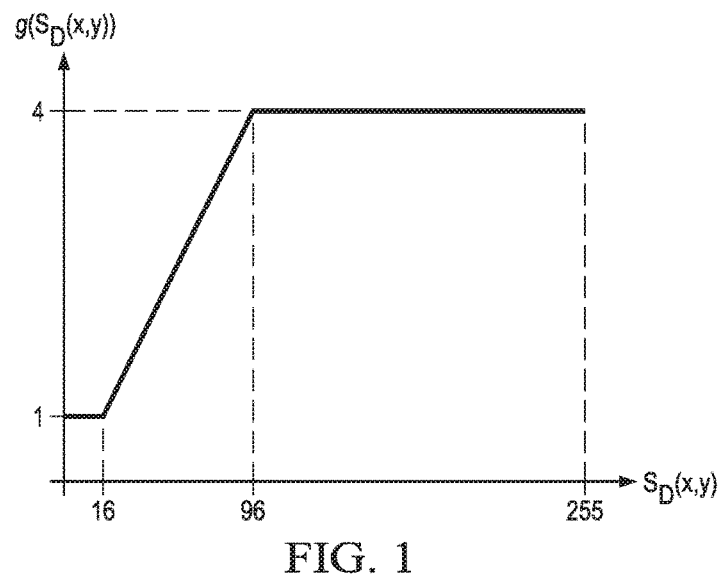
FIG. 1 illustrates an embodiment weighting function of the depth map value in calculating a view synthesis distortion (VSD) metric.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For video mode decision and motion estimation, a Lagrangian technique can be used by which a cost measure $D+\lambda \cdot R$ is determined for each candidate mode or parameter, and the mode or parameter with the smallest cost measure is selected. D is the distortion that is obtained by coding the considered block (in an image frame) in a particular mode or with a particular parameter, R is the number of bits that are required for representing a block in a given mode or that are required for coding a given parameter, and $\lambda$ is the Lagrangian multiplier that is derived based on the used quantization parameter. As measure for the distortion, the sum of squared differences (SSD) or the sum of absolute differences (SAD) between the original and the reconstructed sample values is typically used. For the coding of depth maps in 3D video images, the same decision process can be used. However, the distortion measure needs to include a measure that considers the distortion in synthesized intermediate views.

The geometry information given by depth data is exploited indirectly in the rendering process. Hence, the lossy coding of depth data causes distortions in the synthesized intermediate views. The depth map itself is not visible for a viewer. The efficiency of depth coding is improved by considering this property. As a consequence, the distortion measure for the mode decision process for depth maps can be modified according to a weighted average of the synthesized view distortion and the depth map distortion. To obtain a measure of the synthesized view distortion, two different metrics can be applied in Rate-Distortion Optimization (RDO) and their weighted combination can be used as the final Distortion for RD cost calculation.

The first metric is the synthesized view distortion change (SVDC). The computation of the SVDC requires the usage of rendering functionalities in the encoding process. Since computational complexity is a critical factor in distortion calculation, a method, which is also referred to as renderer model, is utilized which allows minimal re-rendering of parts of the synthesized view that are affected by a depth distortion. For this, a special renderer is included in the encoder, which supports the basic functionalities, shared by most rendering approaches, such as sub-sample accuracy warping, hole filling and view blending.

The second metric is a model based synthesized view distortion estimation without rendering. This metric is obtained by calculating an estimator for the synthesized view distortion by weighting the depth distortion with a factor derived from the absolute value of the derivation of texture view in horizontal direction. One parameter that is used in this metric is the distortion depth map. The distortion of depth map does not linearly affect the synthesis distortion, and the impact of depth map distortions varies according to the corresponding texture information. For example, the same depth distortions on textured and textureless regions lead to different synthesis distortions.

In a typical video coding system, one commonly used distortion function is the sum of squared differences (SSD), which is defined between original and encoded depth block as $$D_{depth} = \sum_{(x,y)\in B} |s_D(x, y) - \tilde{s}_D(x, y)|^2 \quad (1)$$

where $s_D(x,y)$ and $\tilde{s}_D(x,y)$ indicate the original and reconstructed depth map (e.g., after compression), respectively, and (x,y) represents the sample position in a (macro-) block B.

In three-dimensional (3D) high efficiency video coding (3D-HEVC), the conventional sum of squared distortion (SSD) metric may not be good estimate of the synthesized view distortion. Instead, the following view synthesis distortion (VSD) metric can provide a better estimation by weighting the depth distortion $D_{depth}$ with the sum of absolute horizontal texture gradients:

$$VSD = \sum_{(x,y)\in B} \left( \frac{1}{2} \cdot \alpha \cdot |s_D(x, y) - \tilde{s}_D(x, y)| \cdot \right.$$
$$\left. [|\tilde{s}_T(x, y) - \tilde{s}_T(x-1, y)| + |\tilde{s}_T(x, y) - \tilde{s}_T(x+1, y)|]^2 \right) \quad (2)$$

where $\tilde{s}_T$ indicates the reconstructed texture (e.g., after compression), and $\alpha$ is a proportional coefficient determined by $$\alpha = \frac{f \cdot L}{255} \cdot \left( \frac{1}{Z_{near}} - \frac{1}{Z_{far}} \right) \quad (3)$$

with $f$ denoting the focal length, L denoting the baseline between the current and the rendered view, and $Z_{near}$ and $Z_{far}$ representing the values of the nearest and farthest depth of the scene, respectively.

However, it is observe that the same amount of depth distortion $D_{depth}$ may have different impact according to different depth map value $S_D(x,y)$. For instance, the depth distortion has a larger impact when the object is close to camera (large depth value), and a smaller impact when the object is far away from camera (small depth value).

System and method embodiments are provided herein for achieving improved VSD calculation and more accurate distortion estimation, which in turn improves the video coding performance and hence delivers better video quality. For instance, the disclosed improved VSD calculation algorithms can improve the coding efficiency both in 3D-HEVC random access (under common test condition (CTC)) and in All-Intra configuration. In the embodiments, the VSD calculation comprises taking the original depth value $S_D(x,y)$ as one of the evaluation factors and designing a new VSD calculation algorithm to improve the coding efficiency in synthesized view.

In an embodiment, a new VSD calculation algorithm to improve the coding efficiency in synthesized view is obtained as:

$$VSD_{new} = \sum_{(x,y)\in B} \left( \frac{1}{2} \cdot \alpha \cdot g(s_D(x, y)) \cdot \right. \quad (4)$$

$$|s_D(x, y) - \tilde{s}_D(x, y)| [|\tilde{s}_T(x, y) - \tilde{s}_T(x-1, y)| +$$

$$\left. |\tilde{s}_T(x, y) - \tilde{s}_T(x+1, y)|]^2 \right)$$

where $g(s_D(x,y))$ is a suitable piecewise linear function. For instance, the curve of the $g(s_D(x,y))$ above is shown in FIG. 1. In this case, the weighting function $g(s_D(x,y))$ for the depth map value is defined as:

$g(s_D(x,y))=4$, if $s_D(x,y)\geq 96$, $g(s_D(x,y))=(s_D(x,y)-16)/32+1$, if $16<s_D(x,y)<96$, $g(s_D(x,y))=1$, if $s_D(x,y)\leq 16$.

As shown, the weighting factor for depth distortion is larger when the depth map value is larger, indicating a closer object. For farther objects, the depth value is smaller and the mapping results in smaller weighting values for the depth distortion (lower depth impact on distortion).

In another embodiment, a new VSD calculation algorithm to improve the coding efficiency in synthesized view is obtained as:

$$VSD_{new} = \quad (5)$$
$$\sum_{(x,y)\in B} \left( \frac{1}{2} \cdot \alpha \cdot \max(\log 10(s_D(x, y)), 1) \cdot |s_D(x, y) - \tilde{s}_D(x, y)| [|\tilde{s}_T(x, y) - \tilde{s}_T(x-1, y)| + |\tilde{s}_T(x, y) - \tilde{s}_T(x+1, y)|]^2 \right)$$

where $S_D(x,y)$ is the original depth map value and the output of $\max(\log 10(S_D(x,y)),1)$ is the maximum value of $\log 10(S_D(x,y))$ and 1.

In other embodiments, any suitable function that is in the form of $\max(a \log_b(S_D(x,y)+e)+c,d)$ can be used to improve VSD estimation algorithm. For example, choosing the variables a=2, b=2, c=1, d=1 and e=0, the function becomes $\max(2 \log_2(S_D(x,y))+1,1)$ which maps the pixel range of $S_D(x,y)$ from 0~255 to an output $f(S_D(x,y))$ that has the value 1 when $S_D(x,y)$ is smaller than 1, and any of the values 1~17 when $S_D(x,y)$ is larger than 1.

In other embodiments, any suitable function that is in the form of $\max((S_D(x,y)-a)/c, b)$ can be used to improve VSD estimation algorithm. For example, when a=30, b=1, c=45, the function becomes $\max((S_D(x,y)-30)/45, 1)$ which maps the pixel range of $S_D(x,y)$ from 0~255 to an output $f(S_D(x,y))$ that has the value 1 when $S_D(x,y)$ is smaller than 75, and any of the values 1~5 (when $S_D(x,y)$ is larger than 75.

In another embodiment, the improved VSD calculation can be obtained using any suitable function that in the form of:

$f(S_D(x,y))=d$ if $S_D(x,y)>e$, $f(S_D(x,y))=\max((S_D(x,y)-a)/c,b)$ if $S_D(x,y)<=e$.

For example, choosing the variables a=16, b=1, c=64, d=4, and e=192, the pixel range of $S_D(x,y)$ is mapped from 0~255 to an output $f(S_D(x,y))$ that has the value 1 when $S_D(x,y)$ is smaller than 16, any of the values 1~4 when $S_D(x,y)$ is larger than 16 and smaller than 192, and the value 4 when $S_D(x,y)$ is larger than 192.

In yet other embodiments, any suitable linear or non-linear function $f(x)$ that maps the original depth, $S_D(x,y)$, to a suitable weighting function output is $f(S_D(x,y))$ can be used to improve VSD estimation algorithm.

Further, in one embodiment, the improved VSD calculation can be obtained as:

$$VSD_{new} = \sum_{(x,y)\in B} \left( \frac{1}{2} \cdot \alpha \cdot (f(s_D(x, y)))^a \cdot (|s_D(x, y) - \tilde{s}_D(x, y)| \cdot [|\tilde{s}_T(x, y) - \tilde{s}_T(x-1, y)| + |\tilde{s}_T(x, y) - \tilde{s}_T(x+1, y)|]^2)^b \right). \quad (6)$$

For example, choosing the variables a=0.5, b=0.5, and $f(S_D(x,y))=\max(\log 10(S_D(x,y)),1)$, equation (6) becomes:

$$VSD_{new} = \sum_{(x,y)\in B}$$
$$\left( \frac{1}{2} \cdot \alpha \cdot \sqrt{\max(\log 10(s_D(x, y)), 1) \cdot |s_D(x, y) - \tilde{s}_D(x, y)| \cdot [|\tilde{s}_T(x, y) - \tilde{s}_T(x-1, y)| + |\tilde{s}_T(x, y) - \tilde{s}_T(x+1, y)|]^2} \right)$$

In another embodiment, the improved VSD calculation can be obtained using any suitable lookup table, $T_{lookup}$, that maps the value of $S_D(x,y)$ to an output value, $T(S_D(x,y))$. For example, the lookup Table 1 below can be used

TABLE 1

An example of $S_D(x, y)$ mapping lookup table

| $S_D(x, y)$ value | $T(S_D(x, y))$ value |
|---|---|
| 0~50 | 1 |
| 50~100 | 1.5 |
| 100~150 | 2 |
| 150~200 | 2.5 |
| 200~255 | 3 |

In another embodiment, the improved VSD calculation can be obtained using, where it applies, to the whole range of depth map value weight or a partial range of the depth whole range. For example, the weighting factor is calculated as weight=$\log 10(S_D(x,y)+10)$, and the partial range of the depth is calculated as weight=($S_D(x,y)$ large/small than a threshold? $\log 10(S_D(x,y)+10$:1). Under such case, the updated VSD is calculated as $$VSD_{new} = \sum_{(x,y)\in B} \left( \frac{1}{2} \cdot \alpha \cdot \text{weight} \cdot |s_D(x, y) - \tilde{s}_D(x, y)| \cdot [|\tilde{s}_T(x, y) - \tilde{s}_T(x-1, y)| + |\tilde{s}_T(x, y) - \tilde{s}_T(x+1)|]^2 \right).$$

In another embodiment, the improved VSD calculation can be obtained using any suitable form of function $G(x,y)$ that includes the VSD calculation in equations (2) and (3) and the original depth value, $S_D(x,y)$, as input, such as:

$$VSD_{new}=G(VSD,f(S_D(x,y))). \quad (7)$$

In other embodiments, based on the characteristic of video/frame change, the form of weighting factor $f(S_D(x,y))$ and the calculation equation $G(VSD,f(S_D(x,y)))$ described in the embodiments above can change dynamically with the change of video/frame content from $f(S_D(x,y))$ to $f^{(n)}(S_D(x,y))$ and from $G(VSD,f(S_D(x,y)))$ to $G^{(n)}(VSD,f(S_D(x,y)))$ where n is the frame index.

Figure 2:
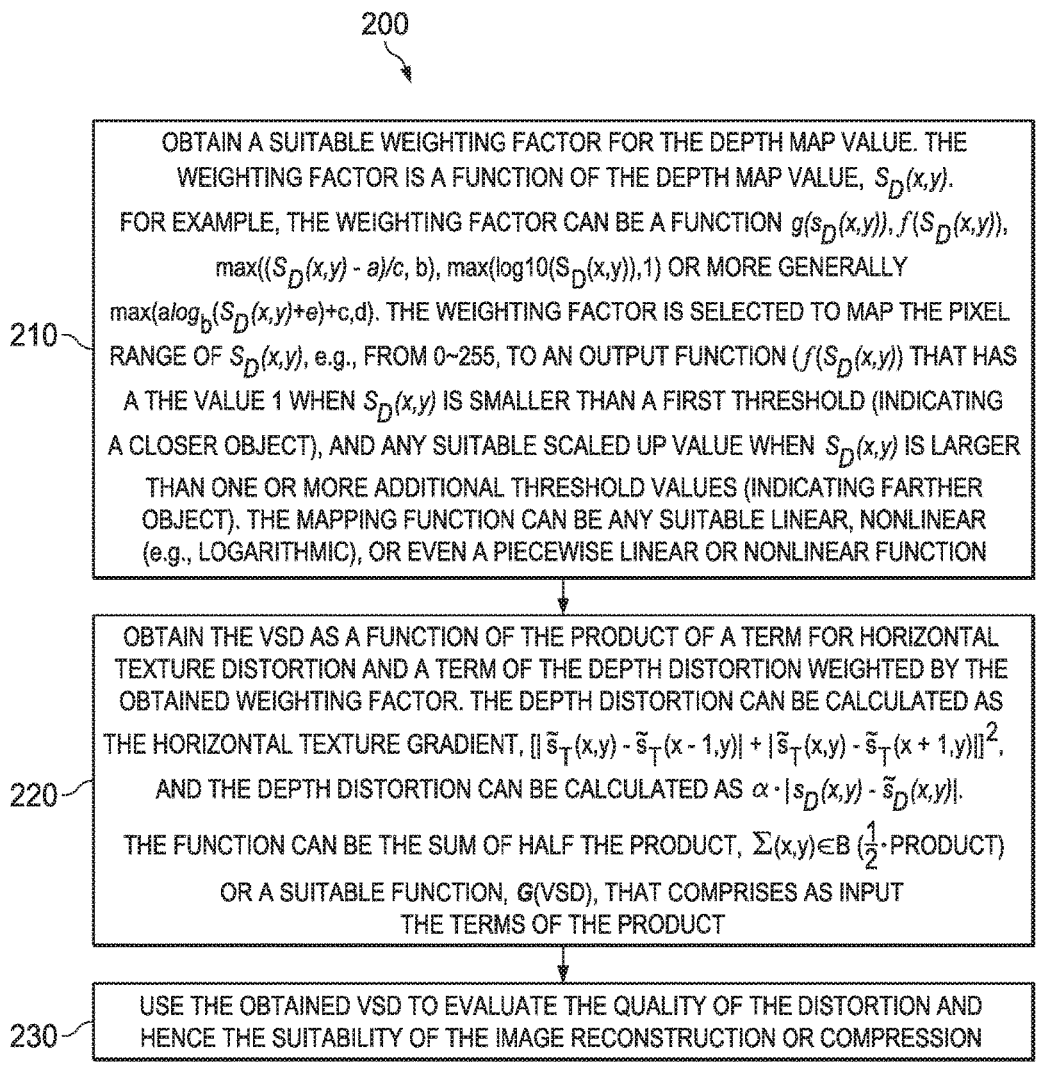
FIG. 2 illustrates an embodiment method for estimating the view synthesis distortion of a 3D video/frame.

FIG. 2 illustrates an embodiment method 200 for estimating the view synthesis distortion (VSD) of a 3D video or frame (image). At step 210, a suitable weighting factor for the depth map value is obtained. The weighting factor is a function of the depth map value, $S_D(x,y)$. For example, the weighting factor can be a function $g(s_D(x,y)),f(S_D(x,y))$, $\max((S_D(x,y)-a)/c, b)$, $\max(\log 10(S_D(x,y)),1)$ or more generally $\max(a \log_b(S_D(x,y)+e)+c,d)$. The weighting factor is selected to map the pixel range of $S_D(x,y)$, e.g., from 0~255, to an output function $(f(S_D(x,y)))$ that has the value 1 when $S_D(x,y)$ is smaller than a first threshold (indicating a closer object), and any suitable scaled up value when $S_D(x,y)$ is larger than one or more additional threshold values (indicating farther object). The mapping function can be any suitable linear, nonlinear (e.g., logarithmic), or even a piecewise linear or nonlinear function.

At step 220, the VSD is obtained as a function of the product of a term for horizontal texture distortion and a term of the depth distortion weighted by the obtained weighting factor. The horizontal texture distortion can be calculated as the horizontal texture gradient, $[|\tilde{s}_T(x, y)-\tilde{s}_T(x-1, y)|+|\tilde{s}_T(X,$ $y) - \tilde{s}_T(x+1, y)|]^2$, and the depth distortion can be calculated as $\alpha \cdot |s_D(X, y) - \tilde{s}_D(x, y)|$. The function can be the sum of half the product, $$\sum_{(x,y)\in B} \left(\frac{1}{2} \cdot \text{product}\right)$$

or a suitable function, G(VSD), that comprises as input the terms of the product. At step 230, the obtained VSD is used to evaluate the quality of the distortion and hence the suitability of the image reconstruction or compression.

Figure 3:
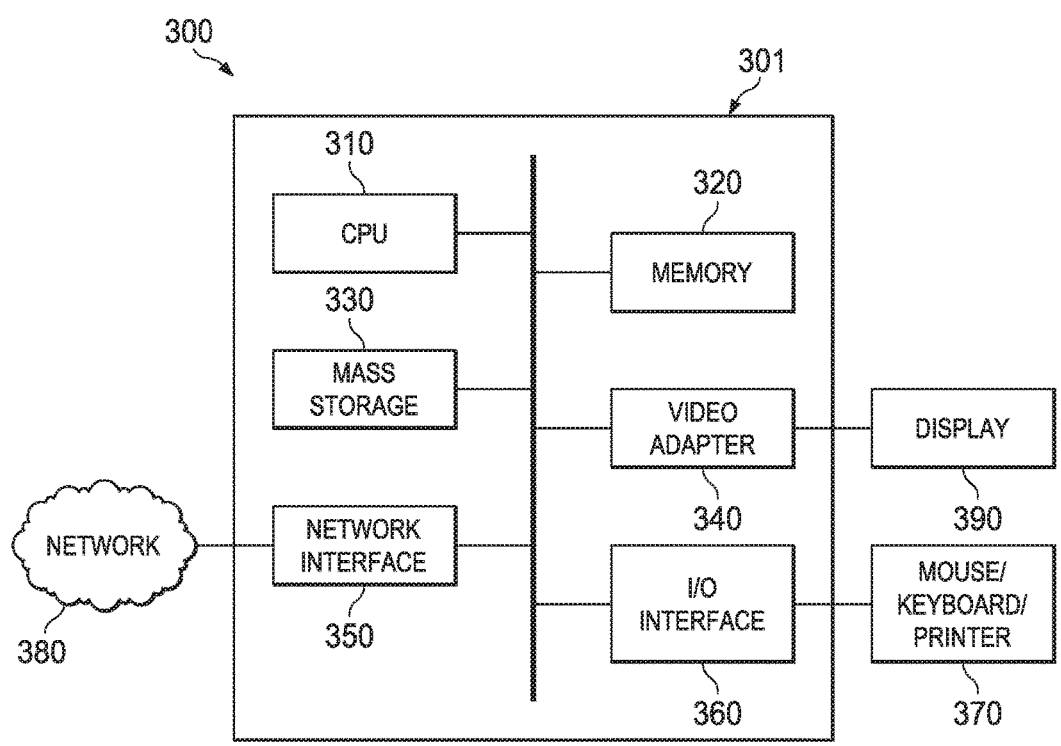
FIG. 3 is a diagram of a processing system that can be used to implement various embodiments.

FIG. 3 is a block diagram of a processing system 300 that can be used to implement various embodiments and algorithms above. For instance the processing system 300 can be part (e.g., in a video encoder or decoder) of a communications device or user equipment (UE), such as a smart phone, tablet computer, a laptop, or a desktop computer. The processing system 300 can also be part of a network entity or component that serves the UE, such as a server, a router, a gateway, a base station or a WiFi access point. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, a memory 320, a mass storage device 330, a video adapter 340, and an I/O interface 360 connected to a bus. The bus may be one or more of any type of several bus architectures including a memory bus or memory controller, a peripheral bus, a video bus, or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 360 provide interfaces to couple external input and output devices to the processing unit. As illustrated, examples of input and output devices include a display 390 coupled to the video adapter 340 and any combination of mouse/keyboard/printer 370 coupled to the I/O interface 360. Other devices may be coupled to the processing unit 301, and additional or fewer interface cards may be utilized. For example, a serial interface card (not shown) may be used to provide a serial interface for a printer.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a processor for estimating view synthesis distortion (VSD) for video coding, the method comprising:
   obtaining a depth map sample value for a video frame;
   determining a weighting factor for depth distortion in accordance with the depth map sample value; and
   calculating, for the video frame, the VSD as a function of absolute horizontal texture gradients weighted by a depth distortion value and the weighting factor determined in accordance with the depth map sample value.

2. The method of claim 1, wherein the weighting factor has a larger value when the depth map sample value has a corresponding larger value indicating a closer image object, and has a smaller value when the depth map sample value has a corresponding smaller value indicating a farther image object.

3. The method of claim 1, wherein the weighting factor is a nonlinear function of the depth map sample value.

4. The method of claim 1, wherein the weighting factor is a piecewise linear or nonlinear function of the depth map sample value.

5. The method of claim 1, wherein the weighting factor is a look-up table with the depth map sample value as input.

6. The method of claim 1, wherein the depth distortion value is calculated based on the depth map sample value and a reconstructed depth map sample value after compression of the video frame.

7. The method of claim 1, wherein the weighting factor is determined in accordance with the video frame, and wherein the method further includes varying the weighting factor based on the video frame under consideration.

8. The method of claim 1, wherein the function for calculating the VSD is determined in accordance with the video frame, and wherein the method further includes varying the function for calculating the VSD based on the video frame under consideration.

9. The method of claim 1, wherein the processor is part of a video encoder or decoder in a user device and a network device.

10. A method by a processor for estimating view synthesis distortion (VSD) for video coding, the method comprising:
   obtaining a depth map sample value for a video frame;
   determining a weighting factor, wherein the weighting factor maps a pixel range of the depth map sample value to an output function having higher values for closer image objects and lower values for farther image objects; and
   calculating the VSD as a product of a term for horizontal texture distortion and a term for depth distortion weighted by the weighting factor.

11. The method of claim 10, wherein the weighting factor is a piecewise linear function, $g(s_D(x,y))$, obtained as:

$g(s_D(x,y))=d$, if $s_D(x,y) \geq e$, $g(s_D(x,y))=(s_D(x,y)-a)/b+c$, if $f<s_D(x,y)<e$, and $g(s_D(x,y))=1$, if $s_D(x,y) \leq f$, and wherein a, b, c, d, e, and f are variables selected appropriately to determine a suitable mapping between the pixel range of the depth map sample value to the output function of the weighting factor.

12. The method of claim 10, wherein the weighting factor is obtained based on a logarithm function of the depth map sample value.

13. The method of claim 10, wherein the weighting factor is obtained as $\max(a \log_b(S_D(x,y)+e)+c,d)$ where $S_D(x,y)$ is the depth map sample value, and wherein a, b, e, c, and d are variables selected appropriately to determine a suitable mapping between the pixel range of the depth map sample value to the output function of the weighting factor.

14. The method of claim 10, wherein the weighting factor is obtained as $\max((S_D(x,y)-a)/c, b)$ where $S_D(x,y)$ is the depth map sample value, and wherein a, c, and b are variables selected appropriately to determine a suitable mapping between the pixel range of the depth map sample value to the output function of the weighting factor.

15. The method of claim 10, wherein the weighting factor is obtained as:

$(S_D(x,y))=d$ if $S_D(x,y)>e$, and $f(S_D(x,y))=\max((S_D(x,y)-a)/c,b)$ if $S_D(x,y)<=e$, and wherein a, b, c, d, and e are variables selected appropriately to determine a suitable mapping between the pixel range of the depth map sample value to the output function of the weighting factor.

16. The method of claim 10, wherein the weighting factor is calculated by a mapping of predetermined pixel ranges of the depth map sample value to weighting factor values.

17. The method of claim 10, wherein the processor is located at a user device or a network device.

18. An apparatus for estimating view synthesis distortion (VSD), the apparatus comprising:
   a non-transitory computer readable storage medium comprising instructions; and
   one or more processors in communication with the non-transitory computer readable storage medium, wherein the one or more processors execute the instructions to:
      obtain a depth map sample value for a video frame;
      determine a weighting factor for depth distortion in accordance with the depth map sample value; and
      calculate, for the video frame, the VSD as a function of a sum of absolute horizontal texture gradients weighted by a depth distortion value and the weighting factor for depth distortion determined in accordance with the depth map sample value.

19. The apparatus of claim 18, wherein the weighting factor has a larger value when the depth map sample value has a corresponding larger value indicating a closer image object, and has a smaller value when the depth map sample value has a corresponding smaller value indicating a farther image object.

20. The apparatus of claim 18, wherein the apparatus is located at a user device or a network device.

* * * * *